United States Patent [19]

Salton et al.

[11] 3,787,740

[45] Jan. 22, 1974

[54] DELAY TIMER

[75] Inventors: Frank G. Salton, Annapolis; Abraham Silverstein, Adelphi, both of Md.

[73] Assignee: The United States of America as represented by the Secretary of the Navy, Washington, D.C.

[22] Filed: Oct. 4, 1972

[21] Appl. No.: 295,062

[52] U.S. Cl. .................. 307/293, 307/109, 307/246, 320/1, 328/129

[51] Int. Cl. .......................................... H03k 17/26

[58] Field of Search 307/109, 110, 246, 293; 320/1; 328/72, 77, 78, 129

[56] References Cited

UNITED STATES PATENTS

| | | | |
|---|---|---|---|
| 2,958,773 | 11/1960 | Langan | 328/78 |
| 3,005,161 | 10/1961 | Bruck | 328/78 |
| 3,047,807 | 7/1962 | Langan | 328/72 |
| 3,032,714 | 5/1962 | Cohen | 307/294 |
| 3,043,222 | 7/1962 | Kaspaul | 328/78 |
| 3,340,811 | 9/1967 | Gauld | 320/1 |
| 3,483,401 | 12/1969 | Michalski | 307/293 |
| 3,500,164 | 3/1970 | Burkhardt et al | 307/293 |

*Primary Examiner*—Stanley D. Miller, Jr.
*Attorney, Agent, or Firm*—R. S. Sciascia, J. A. Cooke and Sol Sheinbein

[57] ABSTRACT

An electronic timer providing an accurate time delay comprising two oppositely charged capacitors connected in series with a resistor. One capacitor is smaller than the other and upon having the series circuit closed, it receives charge from the other capacitor. Upon passing through zero volts, an SCR is triggered setting off a squib.

3 Claims, 2 Drawing Figures

DELAY TIMER

BACKGROUND OF THE INVENTION

The present invention relates to time delay circuits, and more particularly to such circuits providing an accurate time delay interval.

Prior delay timers utilized a primary capacitor charged from a regulated high voltage power supply. The primary capacitor charges a secondary capacitor through a high resistance. A specially developed gas discharge tube is shunted across the secondary capacitor. It fires when the voltage is high enough and activates a squib. This apparatus was deficient in that the gas discharge tube, after having been fired a number of times, would be extremely inaccurate, firing above or below its nominal voltage.

OBJECTS OF THE INVENTION

It is therefore an object of the present invention to provide an extremely accurate time delay mechanism.

Another object of the present invention is to provide a compact and shock resistant delay timer.

A further object of the present invention is to provide a time delay mechanism with no internal source of power.

Yet another object of the present invention is to provide a solid state time delay circuit providing accurate timer intervals.

Still another object of the present invention is to provide a non-mechanical delay timer.

The time delay mechanism in accordance with this invention utilizes two capacitors charged to opposite polarity, the positive capacitor being larger than the negative. The instant the voltage source is removed, the larger capacitor discharges into the negative capacitor through a resistor. The negative capacitor will cross zero volts and a diode shunted across the negative capacitor will produce an output at that instant. An SCR coupled with the diode will then conduct, completing the circuit.

The manner in which the stated objects, and other objects, are achieved, can be better understood by referring to the following specification and drawing, wherein.

DESCRIPTION OF THE PREFERRED EMBODIMENT

Figure 1:
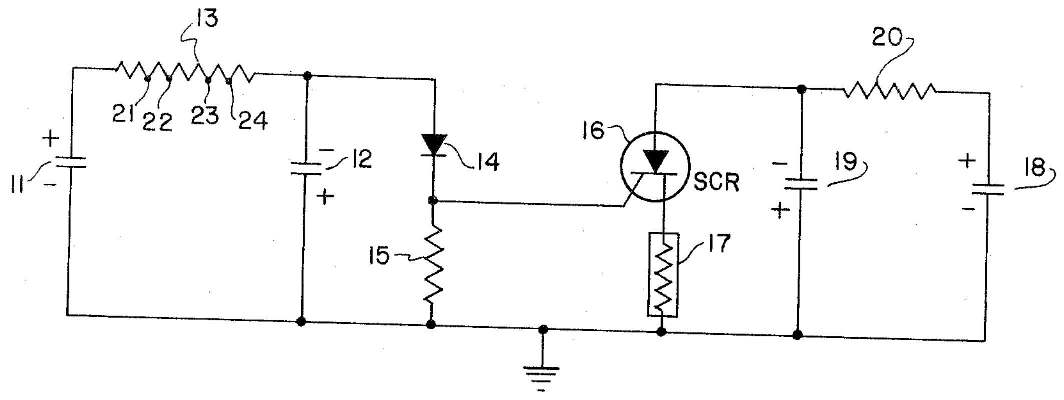
FIG. 1 is a schematic diagram illustrating the invention.

The time delay circuit in accordance with the invention includes a pair of capacitors 11 and 12, capacitor 11 having a capacitance several times greater than capacitor 12. Capacitor 11 is positively charged while capacitor 12 is negatively charged from the same external voltage source (not shown). A high resistance resistor 13 couples capacitor 11 to capacitor 12. The instant the voltage source is removed using a four pole double throw switch, not shown, capacitor 11 discharges through resistor 13 into capacitor 12, reducing the negative potential across capacitor 12 and ultimately charging it positive. If capacitor 11 is four times as large as capacitor 12, capacitor 12 will decay four times more rapidly than across capacitor 11. The time interval being measured is from the start of decay to the crossing of the zero point by capacitor 12.

To produce a signal from the zero crossing, a zero crossing detector comprising diode 14 and resistor 15 is shunted across capacitor 12. No current flows through diode 14 while capacitor 12 is negative. When capacitor 12 turns positive, diode 14 conducts, producing an abrupt positive step voltage across resistor 15, indicating the end of the measured time interval. The base of silicon controlled rectifier 16 is coupled to the output of the diode to produce an output signal upon being activated by the diode 14 signal. This output signal, in turn, can trigger a device such as a squib 17. Capacitors 18 and 19, charged by the same external source charging capacitors 11 and 12, are coupled to the anode of SCR 16 to prevent the SCR from triggering prior to receiving a voltage signal from diode 14.

The time for crossover is determined from the following analysis:

$$V = Q/C \qquad (1)$$

$$C_S = C_{11}\, C_{12}/(C_{11} + C_{12}) \qquad (2)$$

where $C_S$ is the equivalent single capacitor as seen from the terminals of resistor 13, and $$V_S = V_{11} + V_{12} \qquad (3)$$

When capacitor 12 ($C_{12}$) has decayed through resistor 13 to zero volts it has lost $Q = C_{12}\, V_{120}$ coulombs, where $V_{120}$ is the capacitor voltage at the start of the time interval. Since resistor 13, capacitor 12 and capacitor 11 are in series, capacitor 11 also lost $Q = C_{12}\, V_{120}$ coulombs. From equation (1), the voltage loss across $C_{11}$ is $C_{12}\, V_{120}/C_{11}$, leaving $$V_{11} = V_{110} - (C_{12}\, V_{120}/C_{11}) \qquad (4)$$

when $V_{12}$ is zero. By equation (3), this is also the voltage across $C_S$.

The instantaneous voltage $V$ of a capacitor discharging after initially charged to a voltage $V_o$ is given by $$V = V_o e - t/RC \qquad (5)$$

or $$t = RC \log_e V/V_o \qquad (6)$$

Substituting equations (2), (3), (4) into equation (6) one arrives at $$t = R\, C_{11}\, C_{12}/C_{11} + C_{12} \log_e [V_{110} + V_{120}]/[V_{110} - (C_{12}\, V_{120}]/C_{11}) \qquad (7)$$

It is apparent from equation (7) that the zero crossing time is independent of the level of the voltages on capacitors 11 and 21, but rather on the ratio of those voltages, or their capacitances.

For the case where $C_{11} = 2\ \mu f$, $C_{12} = 0.5\ \mu f$, $R = 10^7\Omega$ and $V_{110} = V_{120}$, $t = 3.928$ seconds.

The herein described circuitry provides an extremely accurate delay timer eliminating erratic fluctuations of firing times found in prior art devices. This is due to the fact that diode 14 and SCR 16 have an erratic range of less than 1 volt. The substitution of MOSFET transistors for them would reduce the erratic range even further.

Figure 2:
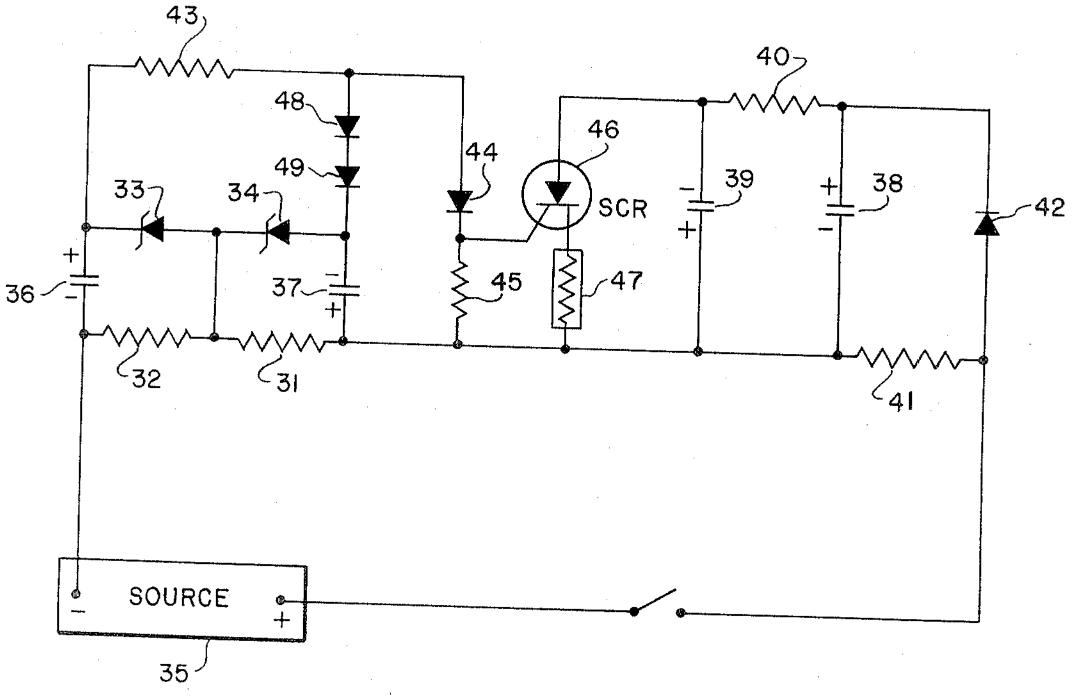
FIG. 2 is a schematic diagram illustrating a non-mechanical version of the invention.

A fixed interval timer without a switch is shown in FIG. 2. The essential mechanism is the same as with the switch. A voltage divider 31, 32, together with two zener diodes 33, 34, provide fixed and equal initial voltage from source 35 on capacitors 36 and 37. Capacitor 38 is charged instantaneously while capacitor 39 receives a delayed arming through resistor 40. Due to the high admittance of capacitors 36 and 37 in series with the forward impedance of Zeners 33 and 34, the initial impedance of the divider and uncharged capacitor is very low. The divider resistances 31, 32 are an additional parallel conductance. During the initial charging surge, nearly all the supply voltage appears across resistance 41. When the voltage across resistance 41 subsides, diode 42 holds the charge on capacitor 38 for slow flow into capacitor 39.

When the first charging rush is completed, capacitor 36, the larger capacitor, has about 20 percent of the supply voltage, while capacitor 37 has most of the rest. Capacitor 37 has a higher voltage than that of the zener breakdown, but bucked by the voltage divider, its charge is trapped by the zener diode. Capacitor 36 charges to the voltage divider potential. At the end of the charging time, which is about 10 milliseconds, the supply if removed and the timing interval begins, then both capacitors 36 and 37 have higher voltages than that of the zeners 33 and 34. As soon as the supply source 35 is removed, capacitors 36 and 37 decay rapidly to the zener voltage and then more slowly through resistor 43.

Zener diode 34 becomes ineffective as a divider isolation when capacitor 37 becomes positive. The current from resistor 43 will drain through the forward direction of the zener 34 into resistor 31 instead of diode 44, resistor 45 and the SCR gate 46, and thus not fire the SCR and squib 47. By placing diodes 48 and 49 in line with resistor 43, the tap-off for the zero detector will turn positive before capacitor 37. The SCR will then fire shortly before the problem arises.

It should be understood that while two diodes 48, 49 are shown, one may be adequate. Similarly, diodes or a large resistor may be substituted for the Zener diodes. Typical values of the element may be Capacitor 36 — $2\mu f$
Capacitor 37 — $0.5\mu f$ Resistor 43 — 13 MΩ
Resistors 31, 32 — 1400Ω
Resistor 41 — 120Ω
Capacitors 38, 39— $0.1\mu f$
Resistor 40 — 10 MΩ
Resistor 45 — 0.1 MΩ
Source 35 — 300 V While only two illustrative embodiments of the invention have been illustrated in detail, it should be obvious that numerous changes could be made without departing from the spirit and scope of the invention. For example, taps 21–24 placed along resistor 13 providing an unlimited number of desired shorter time delays as the zero crossing point travels along resistor 13 to capacitor 12, triggering these taps in sequence.

Therefore, the true spirit and scope of this invention is best described by the appended claims.

We claim:

1. A time delay circuit comprising:

a supply source;

a first capacitor coupled to, and positively charged by said source;

a second capacitor coupled to, and negatively charged by said source, said first capacitor having a capacitance several times larger than said second capacitor, said first capacitor charged in series with said second capacitor;

a resistor coupled between said first capacitor and said second capacitor;

said source coupled between said first capacitor and second capacitor to form a series charging circuit to provide the oppositely charged capacitors;

a diode coupled across said second capacitor, a silicon controlled rectifier coupled to said diode, whereby said diode conducts when said second capacitor turns positive due to discharge of said first capacitor, allowing said silicon controlled rectifier to conduct, and means including a positively charged capacitor coupled to the anode of said silicon controlled rectifier to prevent conducting of said rectifier prior to said diode conducting.

2. A time delay device as recited in claim 1 further including at least one zener diode connected across said resistor; and a voltage divider connected across said first and second capacitors.

3. A time delay device as recited in claim 2 further including at least one diode connected between said resistor and said second negatively charged capacitor.

* * * * *